United States Patent [19]
Roeder et al.

[11] 3,883,876
[45] May 13, 1975

[54] HIGH FREQUENCY RADIOMETRIC TARGET SEEKING AND TRACKING APPARATUS

[75] Inventors: Robert S. Roeder, Dunedin, Fla.; David S. Siegel, Silver Springs, Md.

[73] Assignee: Sperry Rand Corporation, New York, N.Y.

[22] Filed: Jan. 5, 1972

[21] Appl. No.: 215,694

[52] U.S. Cl. ................ 343/117 R; 343/100 ME; 343/100 PE; 343/118
[51] Int. Cl. ............................................ G01s 5/02
[58] Field of Search ......... 343/117 R, 118, 100 ME, 343/100 PE

[56] References Cited
UNITED STATES PATENTS

| | | |
|---|---|---|
| 3,028,596 | 4/1962 | McGillem et al. ............ 343/100 ME |
| 3,230,532 | 1/1966 | Whitney ....................... 343/100 PE |
| 3,689,924 | 9/1972 | Caruso, Jr. ....................... 343/117 R |

Primary Examiner—Maynard R. Wilbur
Assistant Examiner—S. C. Buczinski
Attorney, Agent, or Firm—Howard P. Terry

[57] ABSTRACT

The passive high frequency radiometric target seeking and tracking apparatus is specially adapted for searching an ocean horizon to detect and then to track target marine vessels by strategic employment of polarization discrimination and of the high background radiometric temperatures found near the horizon, thus providing enhanced contrast of cold targets against the warm horizon.

8 Claims, 6 Drawing Figures

HIGH FREQUENCY RADIOMETRIC TARGET SEEKING AND TRACKING APPARATUS

The invention herein described was made in the course of or under a contract or subcontract thereunder with the United States Navy.

BACKGROUND OF THE INVENTION

1. Field of the Invention

The invention pertains to radiometric devices for seeking targets against high background noise temperatures adjacent the earth's horizon and more particularly relates to polarization sensing passive radiometric systems for horizon searching for and tracking of target vessels by employment of the high background radiometric temperatures available near the ocean horizon, thus affording improved contrast of cold targets against the warm horizon and therefore enhanced precision in search and track operations.

2. Description of the Prior Art

Active target searching and tracking devices are well known in the art and are generally characterized by several faults. In particular, because they transmit energy toward a target, they automatically betray their presence and permit means aboard the target to exercise counter measures, such as evasive action, jamming, or the like. The element of surprise is therefore relatively absent in operations with active detection systems.

There are many types of purely passive object detector systems present in the prior art for searching and tracking targets including marine vessels, such as those kinds of detectors operating at infrared and at high radio frequencies, particularly in the microwave bands. For example, high frequency radiometric target detection systems of the passive type do not betray their presence by radiating energy for illuminating the target. Instead, infrared detectors generally detect high frequency radiation emanating from relatively vigorous sources on the target itself, such as high frequency radio radiation from thermally heated elements of the target. Several such sources may be present on a modern target vessel, as well as radio transmitter sources variously located on the target. Generally, however, high frequency noise sources aboard the usual target are electrically shielded and are operated so as to minimize detectable radiation. Furthermore, the background noise level close to the ocean is quite high, as will be seen, and such noise sources may very well be lost by conventional microwave radiometric detectors in view of the presence of the background noise.

SUMMARY OF THE INVENTION

The present invention relates to passive polarization-sensing high frequency or microwave radiometric object detector devices for searching for and tracking targets against the high noise temperatures just above the ocean horizon. The novel radiometer target seeking device automatically searches for and locks on the ocean horizon, automatically tracking the horizon using horizontally polarized energy. In a following mode, the device automatically searches in azimuth along the horizon until a target is sensed. Upon finding a target, the seeker remains locked in elevation on the horizon, still sensing horizontally polarized energy, then becomes locked in azimuth on the target by sensing vertically polarized energy. In a final mode, the system switches to using only vertically polarized noise signals for tracking the target in elevation and in azimuth.

DESCRIPTION OF THE PREFERRED EMBODIMENT

The successful detection of the presence of a marine vessel by an operating directional detection device located substantially at sea level and sensing radiometric high frequency noise signals depends upon several factors. Among these factors are the target ship's profile area relative to the area of the cooperating receiver antenna receptivity pattern at the target ship and the difference between the effective radiometric temperatures of the target ship and of its background. It is significant that the radiation characteristics of the horizon background may be quite as important as the radiation characteristics of the target ship. The radiometric temperature of the horizon background may even be the same as that of the target ship; in this circumstance, the target ship will ordinarily not be detected, no matter how large it may be.

For successful radiometric detector operation substantially at sea level and therefore at angles near the horizon or at low grazing-incidence angles with respect to the surface of an ocean or other body of water, additional factors may beneficially contribute. Marine ships are relatively large targets and are usually good reflectors of high frequency or microwave energy, since they are usually made of metal. Such ships, being good reflectors of high frequency energy, act to block out a significant portion of the horizon background high frequency noise energy, providing a good reflecting path to the cold sky. Further, the effective background radiation temperature in the vicinity of the ship (near ocean surface grazing incidence) is higher than from any other elevation angle, which aids in providing a very high temperature contrast with respect to the ship. It is also observed that the effective background temperature adjacent the horizon using a vertically polarized receiver antenna is fairly uniform, even under moderately rough sea states, thus minimizing the chance of erroneous detector operation.

Figure 1:
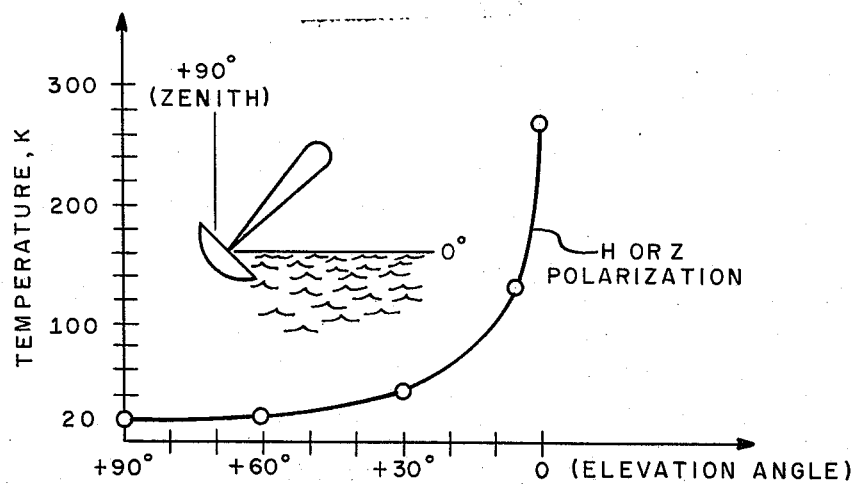
FIGS. 1, 2, and 3 are graphs useful in explaining physical principles employed in the invention.
Figure 2:
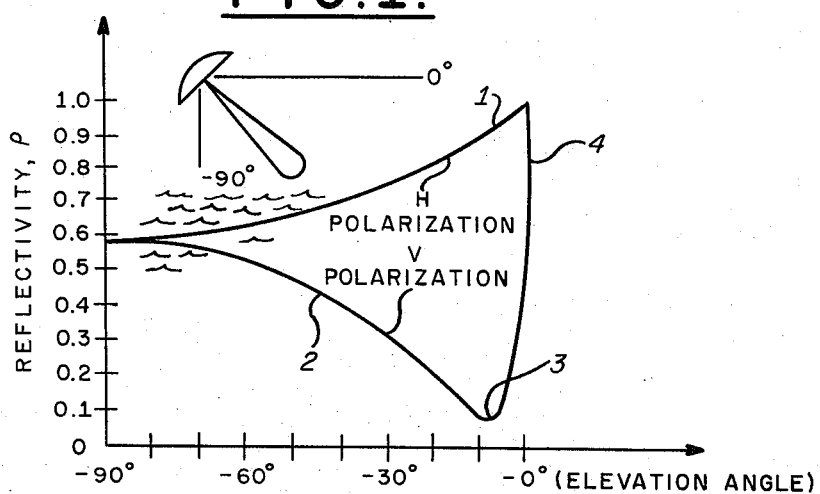
Figure 3:
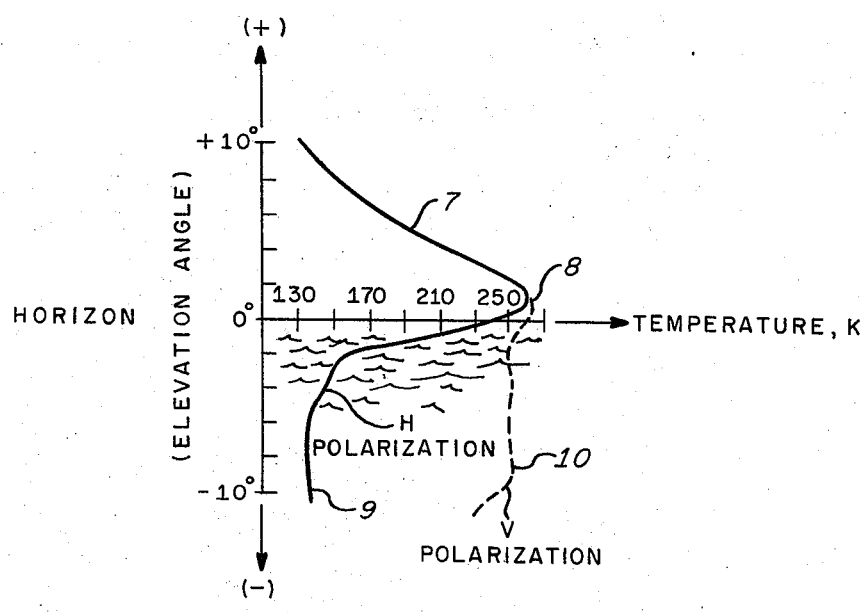

FIGS. 1, 2, and 3 illustrate graphically how the temperature characteristics of the sky at and above the horizon, along with a knowledge of the high frequency reflection characteristics of the ocean, may be used according to the invention. FIG. 1 is an experimental curve in which the apparent sky temperature is plotted in degrees Kelvin as a function of the elevation angle of a directive 35 GHz radiometer antenna above the ocean horizon for a clear day with calm to lightly chopped sea conditions. It is observed that the effective sky temperature is quite low (20°K.) at zenith angle, but begins to rise very rapidly as the horizon is actually approached. Experimental curves taken with horizontally H and vertically V polarized radiometers are found to be substantially the same.

The curve of FIG. 2 is also instructive, representing plots of the 35 GHz reflectivity of the ocean surface for both types of energy polarizations. Curve 1 represents the behavior of reflectivity $\rho$ for horizontal H polarization, which smoothly progresses from about $\rho = 0.58$ at normal vertical incidence to a value of about unity at grazing incidence. On the other hand, the curve for vertical V polarization consists of two distinctive segments 2 and 4; curve 2 progresses again from about $\rho = 0.58$, but falls downwardly to a low value of about $\rho = 0.1$ the point 3 or at the $-8°$ elevation angle and then increases very rapidly as curve 4 to join curve 1 at the $\rho = 1$ value.

The sky temperature characteristic of FIG. 1 represents a major beneficial factor, because it is primarily the difference in energy reflected from the sky by the target ship and the energy flowing from the near-horizon background that yields a significant degree of target ship contrast. As noted in FIG. 1, at 35 GHz and under clear weather conditions, the sky temperature at zenith is approximately 20°K., and it approaches 300°K. at the horizon. Again, the sky temperatures are substantially the same for either horizontal H or vertical V polarization, since the noise radiation coming in from the atmosphere is randomly polarized. The zenith temperature is low because the measuring antenna is looking along the shortest path through the atmosphere to outer space. When looking along the ocean horizon, however, the discovered radiometric temperature approaches the ambient air temperature, since the path length through the atmosphere becomes longest.

The reflectivity of the ocean surface (FIG. 2) is like the reflectivity of any specularly reflecting surface in the high frequency region; i.e., reflectivity $\rho$ is a function both of polarization and angle of incidence. At the $-90°$ angle of vertical incidence:

$$\rho_H = \rho_V$$

At grazing incidence:

$$\rho_H = \rho_V = 1$$

At all other values between angles $-90°$ and $0°$:

$$\rho_V < \rho_H$$

The value of $\rho_H$ increases monotonically between angles $-90°$ and $0°$, while $\rho_V$ has a minimum value near angle $-8°$ caused by the well known Brewster angle effect.

FIG. 3 represents the combined effect of the characteristics represented by the graphs of FIGS. 1 and 2. The sky temperature increases for both polarizations from the zenith toward the horizon along curve 7. The highest effective sky temperature is reached at location 8, at which the measuring antenna is looking into the greatest depth of high frequency noise-emitting atmosphere. For horizontal H polarization, the effective temperature decreases rapidly as represented by curve 9 with depression angles below the horizon as a near mirror reflection of the sky dominates the picture. For the vertical V polarization, the temperature follows the dotted curve 10 for values below the horizon, remaining fairly constant down to the elevation angle $-10°$ a consequence, as noted before, of the Brewster angle phenomenon. For small depression angles, the vertical V polarization reflectivity decreases very rapidly and, consequently, more emission is seen from the sea and less reflection is seen from an increasingly colder sky. The result is the substantial constancy of the curve segment 10 to about $-10°$ elevation angle.

Figure 4:
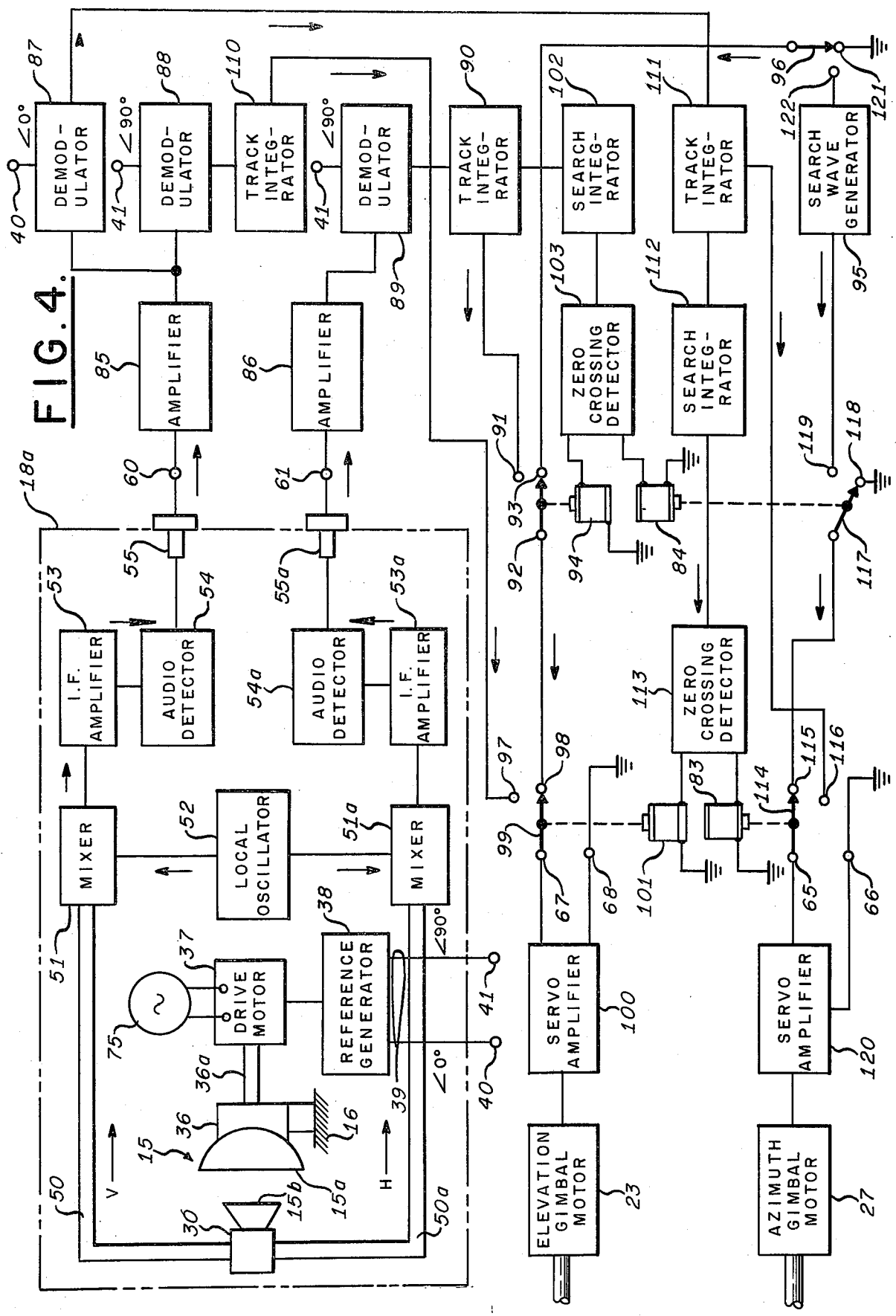
FIG. 4 is a block diagram of the invention particularly illustrating its electrical components and their electrical interconnections.

The apparatus of FIG. 4 is a novel passive high frequency radiometric system adapted for detecting and tracking ships in a low grazing angle situation by employing the above principles and particularly employing the high background radiometric temperatures found near the horizon for providing enhanced target contrast. It is found that non-metallic vessels, as well as those made of steel may also be detected, since they also produce a suitable degree of contrast against the warm horizon. It has furthermore been established that these contrast characteristics remain substantially constant under deteriorating weather conditions, in contrast to the behavior of conventional optical or infrared detectors.

In the system of FIG. 4, the two orthogonal vertical and horizontal polarizations are used to achieve optimum performance. Horizontal H polarization is used to establish a horizon reference while conducting search in azimuth. In this mode, the detector is programmed to track in elevation the horizontally polarized warm radiometric temperature peak just above the horizon as it scans in azimuth, this peak being large and well-defined. In the second or target tracking mode of operation, target detection and accurate tracking capability are enhanced by using vertical V polarization because of the higher and more uniform background temperature that surrounds the target for vertical polarization.

Figure 5:
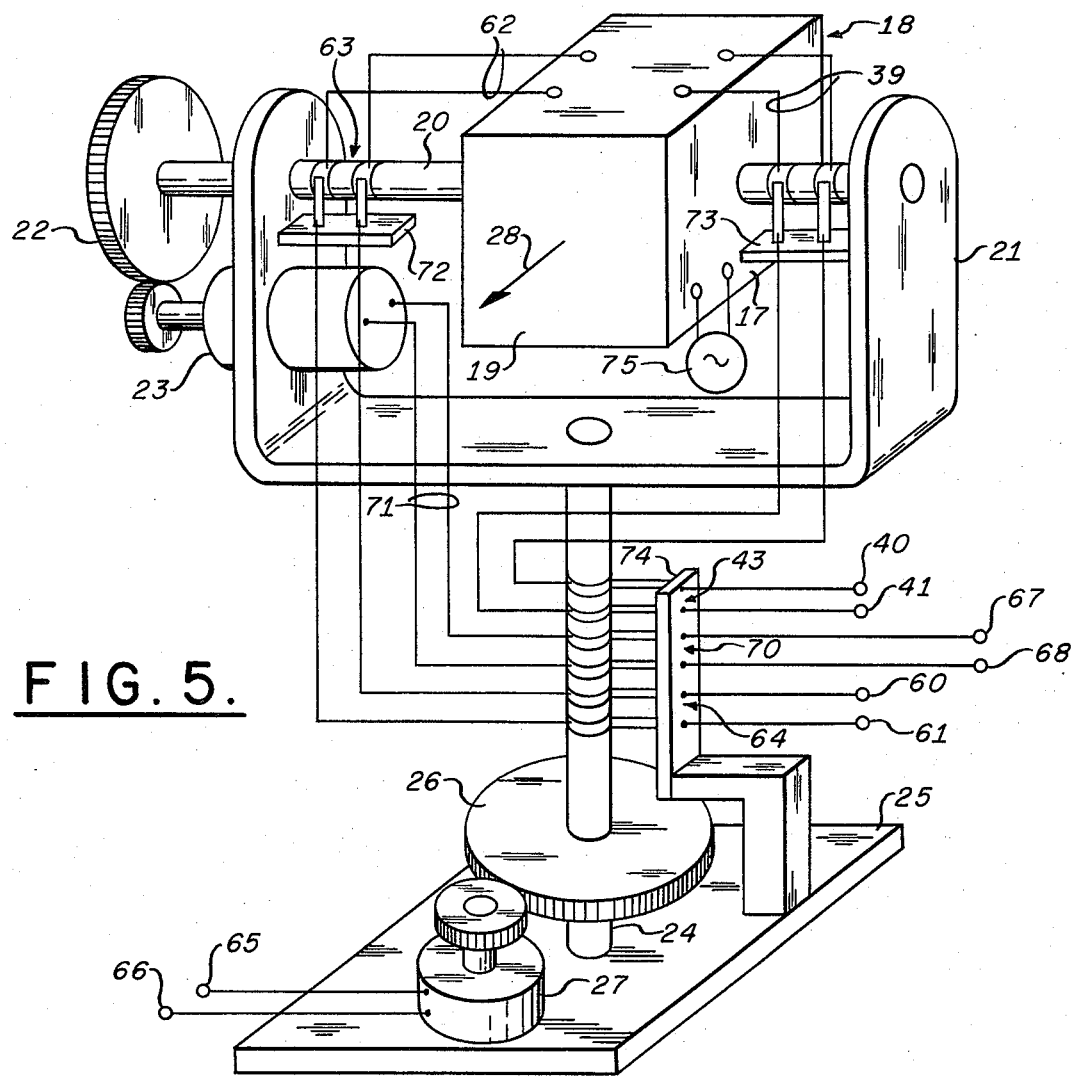
FIG. 5 is a perspective view of an antenna gimbal support and drive system for positioning the antenna of FIG. 4.

In FIG. 4, it will be understood that the passive scanning antenna 15 is mounted for operation with reference to a base 16 which may form a part of the floor 17 or base of the enclosure 18 shown in FIG. 5, which FIG. 5 is drawn using proportions particularly designed to provide clarity in the drawing, and which proportions those expert in the art will recognize as being suited for that purpose and as not necessarily representing proportions which would be used in actual practice. The enclosure 18 of FIG 5. encloses and protects equipment found within the dotted line 18a of FIG. 4, and is provided with a conventional frontal radome 19 transparent to high frequency energy. It will further become apparent that the enclosure 18 and therefore antenna 15 mounted within it are supported on a shaft 20 journaled in gimbal 21 so that antenna 15 may be moved in elevation about shaft 20 by the operation of gearing 22 when the latter is actuated by a motor 23 supported upon one of the arms of gimbal 21. Furthermore, it will become apparent that gimbal 21, and therefore antenna 15, may be rotated in azimuth because gimbal 21 is supported on a rotatable vertical shaft 24. Shaft 24 may be rotated in azimuth within a journal (not shown) in a system base or floor member 25 which floor 25 may, for instance, be part of a ship's deck, when gearing 26 is actuated by the motor 27. The stator of motor 27 is fixed relative to floor or stabilized platform 25.

Antenna drive and gimbal support systems of the general kind shown in FIG. 5 are well known in the prior art, therefore making any detailed description of FIG. 5 unnecessary here. For example, gimbal systems of the general type shown in FIG. 5 are described in the L. A. Maybarduk, et al., U.S. Pat. No. 2,410,831, issued Nov. 12, 1946 for a "Scanning Device" to the Sperry Rand Corporation. Similar gimbal systems are disclosed elsewhere, such as in the E. B. Hammond U.S. Pat. No. 2,740,962 for a "Three-Axis Tracking System," issued Apr. 3, 1956 and also assigned to the Sperry Rand Corporation. In any event, the gimbal and drive system of FIG. 5 may, in some applications, permit as much as full 360 angular degree azimuthal rotation of the radiometer pointing direction or boresight 28 about vertical shaft 24, and generally a more limited angular excursion of radiometer pointing direction or boresight 28 about horizontal shaft 20.

The passive receiver antenna 15 (FIG. 4) is mounted within enclosure 18 for viewing sources of high frequency energy through radome 19 and consists of a conically scanning or nutating reflector 15a for collecting such energy and for focusing it into horn 15b and thence into a conventional dual-mode wave guide transducer 30. Reflector 15a may be conically scanned about the radiometer pointing direction 28, for example, by a scan mechanism 36 such as illustrated in the above mentioned Maybarduk et al patent and elsewhere.

Antenna 15 is shown in FIG. 4 as comprising a reflector 15a adapted for conical scan about the radiometer pointing direction 28 under control of scan mechanism 36, the latter being coupled through shaft 36a to be driven in any suitable fashion by an actuator or drive motor 37, which motor also synchronously drives the two-phase electrical reference generator 38. Quadrature reference voltages appear on the output leads 39 of generator 38, which leads 39, as seen in FIG. 5, may be brought out of enclosure 18 and through the antenna gimbals 40,41. Leads 39 pass through respective conventional elevation and azimuth slip ring and brush pairs 42, 43 so that the two conical scan reference phase voltages are available at terminals 40,41 that are fixed in position relative to floor or deck 25. The electrical signal terminals 40,41 thus provide information as to the instantaneous conical scan excursion of reflector 15a relative to the radiometer pointing direction 28.

The dual mode transducer 30, fed by collector horn 15b, is a conventional multiple port wave guide junction device having a first port coupled to horn 15b and two output ports adapted to segregate the two orthogonal polarization components of any energy focused into horn 15b by conical scan reflector 15a. A first output is supplied to wave guide 50, which receives only vertically polarized components of the received noise signals. Likewise, the second output of dual mode transducer 30 is coupled to wave guide 50a, which receives only horizontally polarized components of the received noise signal. Thus, an instantaneous measure of the relative amplitudes of the vertically and horizontally polarized energy received by conical scan reflector 15a at any of its successive instantaneous positions is available for supply to signal mixers 51,51a, which may be conventional double side band high frequency mixers.

The remainder of the receiver elements preferably found in enclosure 18 performs, in a conventional manner, the function of heterodyning the two signals propagating in the respective wave guides 50, 50a. To perform this function, a local oscillator 52, which may be a conventional diode oscillator, provides a beat frequency signal to mixers 51,51a, generating intermediate frequency signals at their outputs. The respective intermediate frequency signals are supplied for amplification to respective intermediate frequency amplifiers 53,53a. In the usual manner, the respective outputs of intermediate frequency amplifiers 53,53a are applied to the respective audio detectors 54,54a, which devices abstract the left-right and up-down frequency modulation envelope components of the signals processed by them. The elements 50,51,53, and 54 will be spoken of as comprising a vertical polarization channel and the elements 50a, 51a, 53a, and 54a will be spoken of as horizontal polarization channel in what follows.

The respective output signals provided by detectors 54,54a may be brought out of enclosure 18 and through the antenna gimbals (as represented at 55 and 55a in FIG. 4) to the terminals 60,61 of FIG. 5. As seen in FIG. 5, the output leads 62 from the respective audio detectors 54, 54a pass through conventional elevation and azimuth slip ring and brush pairs 63 and 64 so that the two polarization amplitude-indicating audio voltages are available at terminals 60, 61 that are fixed in position relative to floor 25.

With attention still drawn to FIG. 5, it has been seen that the radiometer pointing direction 28 may be controlled by the operation of motors 23 and 27. It is seen that control signals applied to terminals 65, 66 directly cause motor 27 to position the shaft 24 in azimuth. For rotating the horizontal shaft 20, control signals may be applied to terminals 67, 68 for passage through slip ring and brush pair 70 directly to elevation motor 23 via leads 71. The several brushes for the slip-ring-brush pairs are supported in a conventional manner; for example, the brushes associated with shaft 20 are supported by insulating brush holders 72 and 73 from the respective arms of gimbal 21. Likewise, the brushes associated with shaft 24 are supported relative to base 25 by insulating brush holder 74. For supplying all electrical operating power required within enclosure 18, a power source 75 may be provided inside of enclosure 18, or power may be supplied from deck or floor 25 through slip-ring-brush combinations such as those already described in connection with shafts 20 and 24.

The signals at terminals 40,41,60, and 61 will now be used to perform novel operating functions. It will be seen that a conical scan elevation error signal is generated from the signals at terminal 61 of the horizontal polarization channel and is used initially to control the elevation gimbal motor 23, whereas azimuth and elevation conical scan error signals generated from the signals at terminal 60 of the vertical polarization channel may be used to control the azimuth and elevation motors 27 and 23 respectively. Initially, the elevation drive motor 23 is controlled by the horizontal polarization channel signals at terminal 61 and a control changeover is then exercised so that during terminal tracking, as will be discussed, the elevation drive motor 23 is controlled by the signals from vertical polarization channel terminal 60.

The signal on terminal 60 is applied to amplifier 85, while that on terminal 61 is coupled to a similar amplifier 86. The output of amplifier 85 is coupled to two similar phase detectors or demodulators 87 and 88, each of which is supplied with an antenna scan angle reference signal from the two phase reference generator 38. The signal input from amplifier 85 to demodulator 87 is compared in phase to a first or angle 0° reference placed on terminal 40. On the other hand, the same signal input from amplifier 85 to demodulator 88 is compared in phase to a second or angle 90° reference voltage placed on terminal 41. In a generally similar manner, the output of detector 86 coupled in the horizontal polarization channel is supplied through amplifier 86 to a demodulator 89 similar to demodulator 87 and 88. Demodulator 89, for phase comparison purposes, is supplied also with the second or angle 90° reference voltage placed on terminal 41. It will be recognized that the two representations of terminal 40 in FIG. 4 are indeed representations of a single unitary terminal 40, and that the three representations of terminal 41 are likewise representations of a single unitary terminal 41.

Accordingly, it is seen that the two reference quadrature voltages of respective reference phase angles 0° and 90° supplied by reference generator 38 are fed to the respective error demodulators 87, 88, 89 as reference signals for phase demodulation purposes. These quadrature reference voltages serve as phase references for deriving the instantaneous elevation and azimuth angles of the receptivity pattern of antenna reflector 15a with respect to the radiometer pointing axis 28, the boresight axis 28 being coincident with the axis of horn 15b. If the conically scanning antenna 15 is directly on target during the tracking mode of operation, the pointing axis or boresight axis 28 is directly on target, and there is no error signal output from demodulators 87, 88, or 89. If the target is at an angle away from the pointing direction or boresight of antenna 15, error signals will be generated in the customary manner by the demodulators whose magnitude is a measure of the amount the target is off of the true boresight and whose polarity with respect to corresponding antenna position reference signals will indicate the right-left or up-down sense of the deviation or error. As noted, two synchronous demodulators 87 and 88 are required in the vertical polarization channel, but only one (demodulator 89) in the horizontal polarization channel.

The output of synchronous demodulator 89 is fed to the track loop integrator 90, which may be a conventional servo integrator circuit, and thence to contact 91 associated with switch 92 operated by relay 94 between contacts 91 and 93. With switch 92 in the position shown, that switch 92 is connectable by the operation of switch 96 either to ground or to a generator 95 for producing an elevation scan sweep voltage. The blade of switch 92 is always connected to a contact 98 of switch 99 so that the blade supplies signals to a conventional servo amplifier 100 for driving elevation gimbal motor 23. Switch 99 is supplied with two contacts 97 and 98 and is positioned by relay 101 under control of zero crossing detector 113. Signals from track integrator 90 are supplied to a second conventional integrator circuit, namely search integrator 102, whose output is supplied to a conventional zero crossing detector 103 for the control of relay 94 and also to a second relay 84. The search integrator 102 provides additional integration of the error signal before it is fed to zero crossing detector 103. The function of zero crossing detector 103 is to sense the appearance of zero voltage output as the nutating receiver pattern of reflector 15a scans normal to the horizon.

The demodulators 87 and 88 coupled to the vertical polarization channel amplifier 85 also serve important roles. The output of demodulator 88, for example, is integrated by track integrator 110, a circuit similar to integrator 90, and the output of integrator 110 is coupled to contact 97 of switch 99. The output of demodulator 87 is coupled directly to a track integrator circuit 111, which circuit 111 has two outputs. The first of the two outputs of track integrator 111 goes to a search integrator 112 similar to search integrator 102, and whose output controls a zero crossing detector 113 similar to zero crossing detector 103. The output of detector 113 is used to control relay 101 and also a second relay 83. Relay 83 controls the switch 114 that supplies azimuth servo amplifier 120 and has two contacts 115 and 116. The second output of track integrator 111 is supplied to contact 116. Contact 115 is coupled to switch 117 which is controlled by relay 84, controlled, in turn, by detector 103. Switch 117 has two contacts, a contact 118 which is grounded, and a contact 119 which is coupled to the azimuth search wave portion of generator 95 that also generates the elevation search wave form. The azimuth and elevation sweep waves may be synchronized in the conventional manner within generator 95 or may be formed nonsynchronously by duplicate independent generators.

In its inactive state, the radiometer seeker device described in FIGS. 4 and 5 has switch blades 92, 96, 99, 114, and 117 located as shown in FIG. 4 so that the inputs to servo amplifiers 100 and 120 are grounded by switches 96 and 117 being placed on the respective grounding or stow contacts 118 and 121. Motors 23 and 27 of FIG. 5 are therefore stationary. To activate the apparatus, power from a suitable source, such as source 75, is applied to the system components requiring its presence.

It will be shown that the novel radiometric system has three possible modes of operation in any general type of application, as follows:

1. target search using horizontal polarization,
2. target tracking using horizontal polarization, and
3. target tracking using vertical polarization.

These three modes of operation will in the following be discussed by way of example in detail when restricted to operation of the invention as a missile guidance seeker, though it will be understood that the invention has many other possible applications in other environments. In the example, it will be understood that the radiometric seeker will have a restricted field of view as might be expected considering the inherent geometrical characteristics of a missile. The restricted field of view may be tolerated on the assumption that other apparatus of well known type has already determined the general azimuth location of the target.

A short time after power is applied to the conical scan drive motor from source 75 and to other elements of the system, switch 96 is moved either manually to contact 112 or by a time delay relay responsive to the supply of power from source 75. The delay interval inherent in any such time delay relay will preferably be the time period requiring scan motor 37 and reflector 15a to reach full operating speed. In any event, movement of switch 96 to contact 122 will supply a substantially linear symmetrical saw tooth sweep voltage through switches 92 and 99 to elevation servo amplifier 100, in turn, causing elevation motor 23 to drive the front of housing 18 up at a substantially steady rate, the cycle of substantially constant amplitude excursions continuously repeating, if necessary.

As elevation servo motor 23 moves the enclosure 18 about the axis of shaft 20 and therefore antenna 15 and boresight direction 28 up and down, demodulator 89 associated with the horizontal polarization channel of the system will supply scan modulated signals through track integrator 90 and search integrator 102 to the zero crossing detector 103. Normally, on the first elevation sweep of the antenna system, past the target or otherwise upon a succeeding sweep thereafter, the detected horizontally polarized energy provides a peak radiometric temperature value at the output of detector 54a and therefore activates zero crossing detector 103, causing relay 94 to operate. Thereupon, switch 92 moves to contact 91, applying the track integrator 90 signals to control the elevation motor 23. The same output of zero crossing detector 103 goes to operate the time delay relay 84. After a short delay characteristic of relay 84 for permitting the elevation loop to settle on the detected noise temperature peak, relay 84 causes switch 117 to switch to contact 119; this operation permits a symmetric saw tooth wave pattern to be supplied to servo amplifier 120 for driving motor 27 and shaft 24 through an azimuth search pattern.

In this manner, the radiometer antenna 15 and enclosure 18 are swept to the right and left about shaft 24 while the radiometer system is actually locked into elevation tracking operation. On the initial or a subsequent azimuth sweep, the signals supplied via demodulator 87 and the respective integrators 111 and 112 cause zero crossing detector 113 to sense the null in the radiometric temperature as conically scanning antenna 15 is swept in azimuth toward and then in line with a target. Upon sensing such a null, zero crossing detector 113 operates relay 83, moving switch 114 from contact 115 to contact 116. This event couples azimuth servo amplifier 120 for driving azimuth motor 27 to track integrator 111, initiating automatic target tracking in azimuth. At the same time, zero crossing detector 113 actuates time delay relay 101. After a delay sufficient to permit the azimuth tracking loop associated with drive motor 27 to bring the antenna 15 and its boresight 28 substantially to the centroid of the target, switch 99 is operated by relay 101, moving from contact 98 to contact 97. This event transfers the elevation tracking function from the horizon error signals in horizontal polarization channel demodulator 89 to the target vertically polarized signals of demodulator 88. The system now continues automatically to track the target. It is seen that the radiometric seeker:

1. has automatically searched and locked on the horizon, automatically tracking in elevation slightly above the horizon, using horizontal polarization,
2. has automatically searched in azimuth along the horizon until a target is discovered, whereupon the seeker remains locked in elevation upon the horizon using horizontal polarization and becomes locked in azimuth on the target using vertical polarization and,
3. has automatically transferred tracking signals so that the system continues to track using vertical polarization for both azimuth and elevation tracking.

It is seen that the invention, as described, has particular merit for use as a guidance control device for missiles or similar devices. Accordingly, it will be apparent to those with skill in the art that an automatic pilot or other vehicle steering system may readily be slaved in the conventional manner to the radiometric tracking system once the system is automatically tracking using vertically polarized noise signals in both azimuth and elevation. The derived guidance signals may also be supplied to displays or to a computer for processing or for other purposes. The invention is a purely passive device immune to attack because its presence is not betrayed by the radiation of signals to illuminate a target. Horizontal polarization is used to establish a horizon reference for conducting azimuth search. This is accomplished by programming the novel apparatus to seek the horizontally polarized warm radiometric temperature peak just above the horizon where targets are expected first to be sensed. It becomes easy for the device to lock on and track the horizon peak, as it is large and well defined. Vertical polarization is then used for azimuth search and for target tracking. This polarization is employed because of the high and uniform background temperature surrounding the relatively cool target, affording enhanced detection and tracking capabilities.

Figure 6:
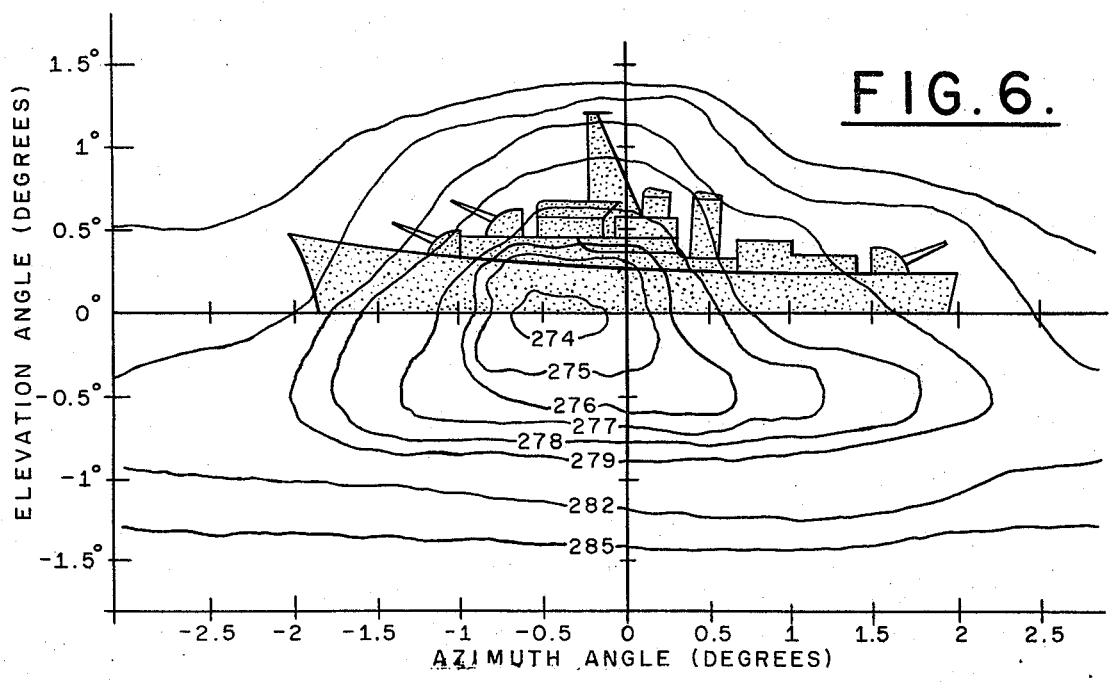
FIG. 6 is a graphical illustration useful in explaining operation of the invention.

The novel detection system particularly benefits because it makes use of characteristics in the passive detection and processing of signals inherent in the nature of noise radiation found close to the horizon, also advantageously using the natural thermal radiation characteristics of typical marine targets and target backgrounds. Making effective use of what is naturally supplied by the physical properties of the environment, the passive system is particularly desirable for tracking a a location substantially fixed to a target. As in FIG. 6, the novel passive system will track substantially the center of the profile 274 of a set of noise energy profiles 274 to 285 characteristic of high frequency noise emissions from a metal vessel, the units 274 to 285 are measured 35 GHz radiometric temperatures in degrees Kelvin. This is in particular contradistinction to conventional pulsed and continuous wave object detection systems which often yield erratic data, the tracking point on a relatively long target moving back and forth along its greatest dimension in a rather random manner.

While the invention has been described in its preferred embodiments, it is to be understood that the words which have been used are words of description rather than of limitation and that changes within the purview of the appended claims may be made without departure from the true scope and spirit of the invention in its broader aspects.

We claim:
1. In a high frequency target detector system having antenna means for conically scanning about a boresight direction coupled to receiver means for generating error signals representing the deviation of said boresight direction from said target:
means responsive to said receiver means for causing said antenna means automatically to search in elevation and to locate the natural high frequency noise maximum proximate the earth's horizon,
means responsive to said receiver means for causing said antenna means to lock on said noise maximum for automatically tracking said noise maximum in elevation,
means responsive to said receiver means for causing said antenna means automatically to search and locate in azimuth a target while automatically tracking said noise maximum,
means responsive to said receiver means for causing said antenna means automatically to lock on said target for automatically tracking said target in azimuth while automatically tracking said noise maximum in elevation, and
means responsive to said receiver means for causing said antenna means automatically to track said target in azimuth and elevation.

2. Apparatus as described in claim 1 wherein said receiver means comprises:
- transmission line junction means responsive to said scanning antenna means for separately supplying high frequency vertically and horizontally polarized component signals collected by said antenna means to first and second junction means port means,
- first and second heterodyne receiver means respectively coupled to said first and second port means, and
- first and second demodulator means respectively responsive to said receiver means for developing said error signals in response to the conical scanning of said antenna means.

3. Apparatus as described in claim 2 wherein:
- said antenna means is journalled by gimbal means for movement about a horizontal axis by elevation drive motor means, and
- said gimbal is supported for movement about a vertical axis by azimuth drive motor means.

4. Apparatus as described in claim 3 wherein said means responsive to said receiver means for causing said antenna means automatically to search in elevation and to locate the natural high frequency noise maximum proximate the earth's horizon comprises:
- saw toothed wave generator means,
- first switch means for causing said elevation motor means to respond to said saw toothed wave generator means,
- first integrator means responsive to said first demodulator means, and
- first zero crossing detector means responsive to said first integrator means.

5. Apparatus as described in claim 4 wherein said means responsive to said receiver means for causing said antenna means to lock on said noise maximum for automatically tracking said noise maximum in elevation comprises:
- second switch means responsive to said first zero crossing detector means for causing said elevation motor means to be responsive to said first integrator means.

6. Apparatus as described in claim 5 wherein said means responsive to said receiver means for causing said antenna means automatically to search and locate in azimuth a target while automatically tracking said noise maximum comprises:
- third switch means responsive to said first zero crossing detector means for causing said elevation motor means to be responsive to said saw toothed wave generator means.

7. Apparatus as described in claim 6 wherein said means responsive to said receiver means for causing said antenna means automatically to lock on said target for automatically tracking said target in azimuth while automatically tracking said noise maximum in elevation, comprises:
- second integrator means responsive to said second demodulator means,
- second zero crossing detector means responsive to said second integrator means,
- fourth switch means responsive to said second zero crossing detector means for causing said azimuth motor means to respond to said second integrator means.

8. Apparatus as described in claim 7 wherein said means responsive to said receiver means for causing said antenna means automatically to track said target in azimuth and elevation comprises:
- third integrator means responsive to said second demodulator means, and
- fifth switch means responsive to said second zero detector means for causing said elevation motor means to be responsive to said third integrator means.

* * * * *